(12) United States Patent
Kitajima

(10) Patent No.: US 7,121,491 B2
(45) Date of Patent: Oct. 17, 2006

(54) REEL UNIT FOR SPINNING REEL

(75) Inventor: Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/287,239

(22) Filed: Nov. 28, 2005

(65) Prior Publication Data
US 2006/0076445 A1    Apr. 13, 2006

Related U.S. Application Data

(62) Division of application No. 10/926,359, filed on Aug. 26, 2004, now Pat. No. 7,066,419.

(30) Foreign Application Priority Data

Sep. 10, 2003   (JP) .............................. 2003-317778
Feb. 20, 2004   (JP) .............................. 2004-043987

(51) Int. Cl.
      *A01K 89/00*   (2006.01)
(52) U.S. Cl. ....................... 242/316; 242/310; 242/311
(58) Field of Classification Search ................ 242/310, 242/311, 312, 316
      See application file for complete search history.

(56) References Cited

U.S. PATENT DOCUMENTS 3,877,658 A  *  4/1975  Lemery ....................... 242/236
4,927,094 A     5/1990  Henriksson
5,476,230 A  *  12/1995 Yamaguchi .................. 242/311
6,641,070 B1 *  11/2003 Wong ......................... 242/312
6,857,588 B1 *  2/2005  Chang ........................ 242/311
2003/0146324 A1  8/2003  Yeh
2003/0146325 A1* 8/2003  Kitajima ..................... 242/311
2004/0200917 A1* 10/2004 Nishikawa ................... 242/311
2004/0251362 A1* 12/2004 Myojo ........................ 242/310
2005/0051652 A1* 3/2005  Myojo et al. ................. 242/311

FOREIGN PATENT DOCUMENTS

JP    REG. 712318      9/1987
JP    2000-004738 A    1/2000

* cited by examiner

*Primary Examiner*—Emmanuel Marcelo
*Assistant Examiner*—Evan Langdon
(74) *Attorney, Agent, or Firm*—Global IP Counselors, LLP

(57) ABSTRACT

The reel unit includes a reel body that accommodates a variety of mechanisms therein and a T-shaped rod attachment leg that extends diagonally frontward and formed integrally with the reel body. The reel body includes a body member having an accommodation space in the interior thereof that opens to a side, and a lid member detachably mounted on the body member to cover the opening of the body member. A reduced thickness portion is formed in an upper rear portion of the reel body, where the rod attachment leg connects the reel body. The reduced thickness portion has a peripheral rim portion and a recessed portion that is further recessed from the peripheral rim portion. The cover member is mounted to cover the rear lower portion of the reel body in order to cover at least the peripheral rim portion of the reduced thickness portion.

10 Claims, 15 Drawing Sheets

REEL UNIT FOR SPINNING REEL

This is a divisional application of U.S. application Ser. No. 10/926,359, filed Aug. 26, 2004, now U.S. Pat. No. 7,066,419 which claims priority to Japanese Applications Nos. 2003-317778, filed Sep. 10, 2003, and 2004-043987, filed Feb. 20, 2004. Certified copies of the priority documents have been filed in the parent application.

BACKGROUND OF THE INVENTION

1. Field of the Invention

The present invention relates to a reel unit. More specifically, the present invention relates to a reel unit of a spinning reel mounted to a fishing rod and capable of reeling out fishing line.

2. Background Information

A spinning reel generally has a reel unit mounted to a fishing rod, a handle rotatably attached to a reel unit, a rotor rotatably fitted to the reel unit, and a spool fitted to the reel unit at the front of the rotor that can be shifted back and forth. Fishing line is guided by the rotor and is wound around the periphery of the spool.

This type of reel unit is furnished with a T-shaped rod attachment leg mounted on a fishing rod, and a reel body that is formed integrally with the rod attachment leg. A variety of mechanisms is accommodated in the interior of the reel body. The reel body includes a body member having an accommodation space in the interior thereof that opens to a side, and a lid member detachably mounted on the body member for covering the opening of the body member.

With this type of reel unit, it is desirable to make the front-to-rear direction length of the rod attachment leg short so that an angler can easily hold the rod attachment leg with their fingers when holding the fishing rod. In addition, it is desirable to make the front-to-rear direction length of the reel body longer so that the reel body can accommodate various mechanisms in the interior thereof. When trying to realize both of these requirements, the strength of the portion that connects the rod attachment leg and the reel body may be significantly reduced because of a severe change in the front-to-rear direction length. Thus, when the front-to-rear direction length of the portion that connects the rod attachment leg and the reel body is formed so that the change in size occurs gradually, a high degree of strength can be maintained. But the weight of the reel unit will increase since the area connecting the rod attachment leg and reel body is formed with a large wall thickness.

In order to solve this kind of problem, a reel unit with a through hole formed from the rear above the portion that connects the rod attachment leg and the reel body is known, as shown in, for example, Japanese Design Registration Publication No. 712318. By forming this type of through hole, the overall weight of the reel unit can be reduced, and the design can be improved.

With this type of conventional reel unit for a spinning reel, the overall weight of the reel unit can be reduced because a through hole is formed above the portion that connects the rod attachment leg and the reel body. However, when this type of through hole is formed, damage can occur at the peripheral rim portion of the through hole when the reel is dropped or when it comes into contact with a rock. If the peripheral rim portion of the through hole is damaged, a decline in the overall strength of the reel unit may occur.

In view of the above, it will be apparent to those skilled in the art from this disclosure that there exists a need for an improved reel unit for a spinning reel. This invention addresses this need in the art as well as other needs, which will become apparent to those skilled in the art from this disclosure.

SUMMARY OF THE INVENTION

In view of the aforementioned problems, it is therefore an object of the invention to reduce the overall weight of the reel and to maintain a high level of overall strength for the reel unit.

A reel unit according to a first aspect of the present invention is a reel unit of a spinning reel mounted to a fishing rod and capable of reeling out fishing line. The reel unit includes a reel body, a T-shaped rod attachment leg, a reduced thickness portion, and a cover member. The T-shaped rod attachment leg is adapted to be mounted to the fishing rod. The T-shaped rod attachment leg extends diagonally frontward and being formed integrally with the reel body. The reduced thickness portion is formed on a rear surface of the rod attachment leg above where the rod attachment leg connects the reel body. The cover member is configured to cover at least the peripheral rim portion of the reduced thickness portion.

With this reel unit, since the reduced thickness portion having for instance a through hole and an indentation is formed above the portion that connects the rod attachment leg and the reel body, the overall weight of the reel unit can be reduced. In addition, since at least the peripheral rim portion of the reduced thickness portion is covered by the cover member, the overall strength of the reel unit can be maintained at a high level. In addition, by mounting this type of cover member, the design can be improved.

A reel unit according to a second aspect of the present invention is the reel unit of the first aspect, in which the cover member has an opening that faces the reduced thickness portion. With this configuration, since the cover member includes the opening, further weight reduction can be realized.

A reel unit according to a third aspect of the present invention is the reel unit of the first aspect, in which the cover member closes the reduced thickness portion. With this configuration, since the cover member covers the entire reduced thickness portion, the strength of the reel unit can be maintained at an even higher level.

A reel unit according to a fourth aspect of the present invention is the reel unit of any of the first to third aspects, in which the peripheral rim portion of the reduced thickness portion has a recessed portion that is recessed from surrounding surfaces of the rod attachment leg and the reel body. With this configuration, by providing the recessed portion as the reduced thickness portion, the amount of the recess can be properly adjusted, and thus the weight reduction and the strength maintenance can be balanced.

A reel unit according to a fifth aspect of the present invention is the reel unit of any of the first to third aspects, in which the reduced thickness portion has a through hole that passes through the rod attachment leg and the reel body. With this configuration, by providing the through hole as the reduced thickness portion, the reduced thickness portion can be formed easily.

A reel unit according to a sixth aspect of the present invention is the reel unit of the fifth aspect, in which the peripheral rim portion of the reduced thickness portion has an indentation that is recessed from surrounding surfaces of the rod attachment leg and the reel body. With this configuration, by jointly providing the through hole and the indentation as the reduced thickness portion, the design can be improved.

A reel unit according to a seventh aspect of the present invention is the reel unit of the sixth aspect, in which the through hole is formed at a position that is offset from a center of the reduced thickness portion. With this configuration, weight reduction can be further achieved because the formation of the through hole will be easier, and the area in which the indentation can be disposed will be widened.

A reel unit according to an eighth aspect of the present invention is the reel unit of the sixth or seventh aspect, in which the indentation includes an oblique surface that is inclined toward the through hole. With this configuration, for example, by inclining the indentation so that the indentation and the through hole are smoothly connected, the design can be further improved.

A reel unit according to a ninth aspect of the present invention is the reel unit of any of the first to eighth aspects, in which the reel body includes a body member and a lid member configured to be mounted to the body member. With this configuration, by forming the reduced thickness portion on a portion where the rod attachment leg and the reel body are connected or on a portion where the rod attachment leg and the lid member are connected, the overall weight of the reel unit can be reduced and the overall strength of the reel unit can be maintained at a high level.

A reel unit according to a tenth aspect of the present invention is the reel unit of the ninth aspect, in which the rod attachment leg is formed to be integral with the body member. With this configuration, since the rod attachment leg and the body member are integrally formed, the structure of the lid member is simpler than the case where the rod attachment leg and the lid member were integrally formed.

A reel unit according to an eleventh aspect of the present invention is the reel unit of the ninth aspect, in which the rod attachment leg is formed to be integral with the lid member. With this configuration, since the rod attachment leg and the lid member are integrally formed, the commingling of the thick portions and thin portions thereof is reduced and the body member is made thin to increase and to maintain the precision thereof. Further, the rod attachment leg is made thick to maintain the strength thereof.

A reel unit according to a twelfth aspect of the present invention is the reel unit of any of the first to eleventh aspects, in which the reel body includes first engagement portions on its lower portion. The cover member includes a first cover member and a second cover member. The first cover member covers the rear portion of the reel body from the rear portion of the rod attachment leg, and a second cover member mounted to the first cover member. The first cover member is configured to cover the reel body and the rod attachment leg from rear, and includes a first hole portion, a first engaged portion, a second engaged portion, and a third engagement portion. The first hole portion is formed on an upper rear portion of the first cover member. The first engaged portion is formed on a lower rear portion of the first cover member to engage with the first engagement portion from rear. The second engaged portion is formed on the first hole portion. The third engagement portion is formed in the first hold portion at a position different from that of the second engaged portion. The second cover member is mounted to cover the first hole portion of the first cover member. The second cover member includes a fixing portion, a second engagement portion, and a third engagement portion. The fixing portion engages the first hole portion from rear to be fixedly coupled to the reduced thickness portion. The second engagement portion is configured to engage the second engaged portion from rear. The third engaged portions are formed at positions separated from the fixing portion. The third engagement portion is formed at a position different from that of the fixing portion and configured to engage with the third engagement portion from front. The reduced thickness portion includes a second hole portion formed where the rod attachment leg that connects with the reel body, the second hole portion communicating with the first hole portion.

In this case, two cover members, one of which is the first cover member to cover the rear portion of the rod attachment leg and the reel body, and the other of which is the second cover member to cover the first hole portion of the first cover member, are mounted to this reel unit. In order to mount these cover members, the first engaged portion of the first cover member engages with the first engagement portion of the lower portion of the reel body. Next, the third engaged portion of the second cover member engages with the third engagement portion of the first cover member from the front, and the second engaged portion of the first cover member engages with the second engagement portion on the upper portion of the second cover from the rear. In this state, the fixing portion on the upper portion of the second cover member is fixed to the portion where the rod attachment leg and the reel body are connected. Here, the first cover member is loosely retained to the second cover member by the second engagement portion and the second engaged portion, the second cover member is loosely retained to the first cover member by the third engagement portion and the third engaged portion, and in the mean time the two cover members (the first cover member and the second cover member) are fixedly attached to one another by the fixing portion of the second cover member. By providing the fixing portion on the second cover member in this way, the first cover member and the second cover member are loosely retained to one another while the first cover member and the second cover member are fixedly attached to the reel unit. Thus, since there is no need to provide a fixing portion on the first cover member, two cover members can be provided with an inexpensive structure. Furthermore, the design can be further improved by forming the second hole portion on the rod attachment leg.

A reel unit according to a thirteenth aspect of the present invention is the reel unit of the twelfth aspect, in which the second cover member further includes a third hole portion that communicates with the second hole portion. With this configuration, the design can be further improved by forming the third hole portion on the second cover member.

A reel unit according to a fourteenth aspect is the reel unit of the twelfth or thirteenth aspect, in which the reel body further includes a fourth hole portion that passes through the reel body. The first cover member includes a fifth hole portion that communicates with the fourth hole portion. With this configuration, a rear drag mechanism can be mounted in the fourth and fifth hole portions, for example, as with a rear drag type spinning reel.

A reel unit according to a fifteenth aspect of the present invention is the reel unit of any of the twelfth to fourteenth aspects, in which the second engagement portion is a partially cut out recess. The second engaged portion is a convex portion that projects inward of the first hole portion and engages with the second engagement portion. With this configuration, since the recessed portion and the convex portion are easily formed, the structure of the second engagement portion and the second engaged portion are simplified.

A reel unit according to a sixteenth aspect of the present invention is the reel unit disclosed in any of the twelfth to fifteenth aspects, in which the third engagement portion is a partially cut out recess formed on the first hole portion. The third engaged portion has a convex portion that projects outward and engages with the recess. With this configuration, since the recessed portion and the convex portion can be easily formed, the structure of the third engagement portion and the third engaged portion will be simplified.

A reel unit according to a seventeenth aspect of the present invention is the reel unit of the twelfth to sixteenth aspects, in which the fixing portion is a boss portion that engages with a screw member installed from the front. With this configuration, since the fixing portion, for example, projects forward and is a boss portion having a female threaded portion formed therein which engages with the screw member, the attachment of the second cover member will be simplified.

A reel unit according to an eighteenth aspect of the present invention is the reel unit of any of the twelfth to seventeenth aspects, in which the reel body includes a body member, and a lid member that is mounted to the body member. With this configuration, since the first cover member is mounted at least on one of the body member and the lid member, two cover members can be mounted using an inexpensive structure.

A reel unit according to a nineteenth aspect of the present invention is the reel unit of the eighteenth aspect, in which the rod attachment leg is formed to be integral with the body member. With this configuration, since the rod attachment leg and the body member are integrally formed, the structure of the lid member will be simpler when compared to a structure in which the rod attachment leg and the lid member are integrally formed.

A reel unit according to a twentieth aspect of the present invention is the reel unit of the eighteenth aspect, in which the rod attachment leg is formed to be integral with the lid member. With this configuration, since the rod attachment leg and the lid member are integrally formed, the commingling of the thick portions and thin portions thereof is reduced and the body member is made thin to increase and to maintain the precision thereof, and the rod attachment leg is made thick to maintain the strength thereof.

According to the present invention, in a reel unit for a spinning reel, by forming the reduced thickness portion above the portion that connects the rod attachment portion and the reel body, and by covering at least the peripheral rim portion of the reduced thickness portion with the cover member, the overall weight of the reel unit can be reduced and the overall strength of the reel unit can be maintained at a high level. In addition, since there is no need to provide a fixing portion on the first cover member, two cover members can be provided with an inexpensive structure.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
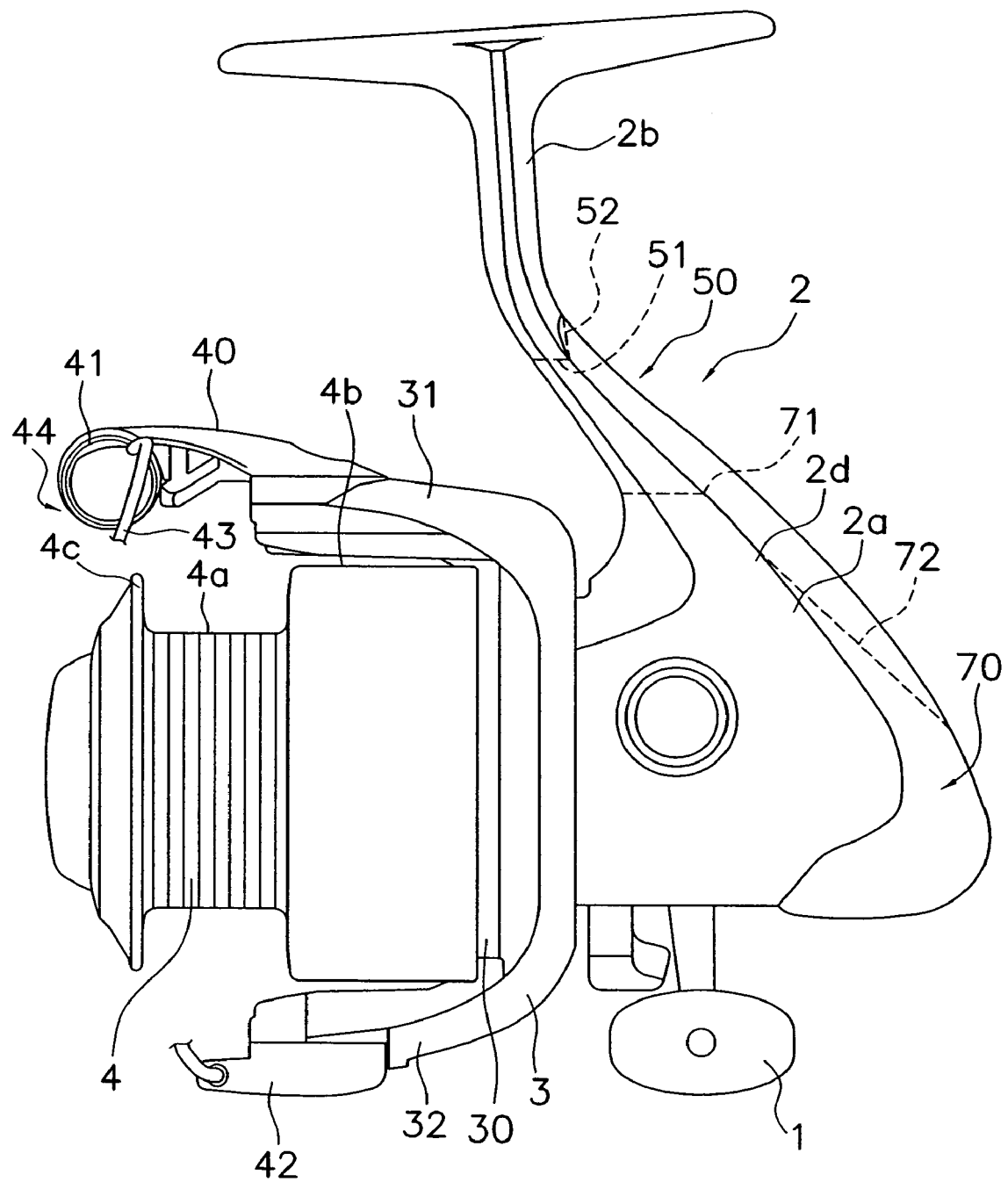
FIG. 1 is a lateral view of a spinning reel in accordance with a first preferred embodiment of the present invention.
Figure 2:
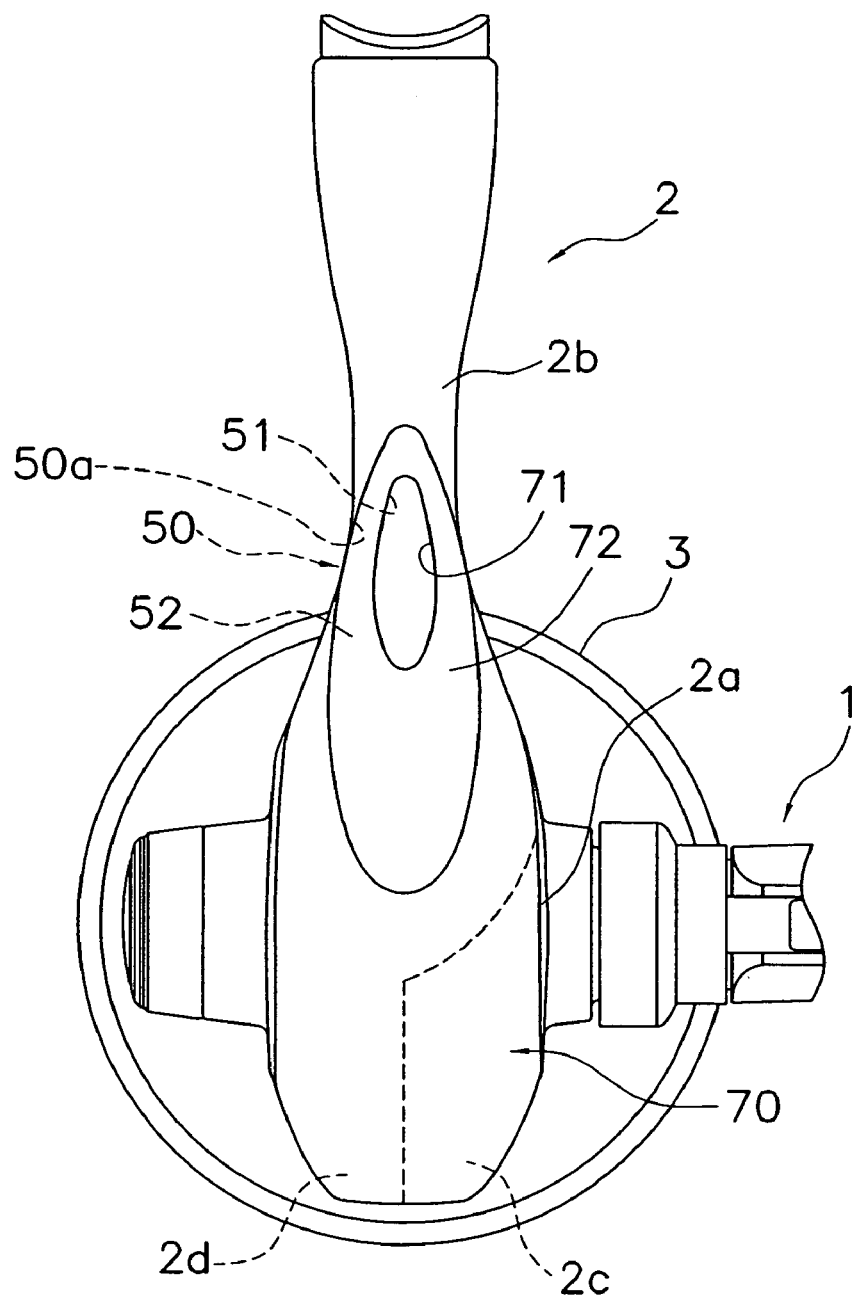
FIG. 2 is a rear view of the spinning reel.

As shown in FIGS. 1 and 2, a spinning reel in accordance with a first preferred embodiment of the present invention includes a reel unit 2 that can be mounted to a fishing rod, a rotor 3, a spool 4, and a handle 1 that is rotatably supported by the reel unit 2. The rotor 3 is provided to wind fishing line around the spool 4, and is rotatably supported at the front of the reel unit 2. The spool 4 is provided to have fishing line wound around the outer peripheral surface thereof, and is disposed on the front of the rotor 3. In other words, the spool 4 and the reel unit 2 axially interpose the rotor 3. The spool 4 can be reciprocated relative to the reel unit 2. The handle I is mounted on the right side of the reel unit 2 as shown in FIGS. 1 and 2, but it can also be mounted on the left side of the reel unit 2.

As shown in FIGS. 1 and 2, the reel unit 2 includes a reel body 2a to accommodate a variety of mechanisms therein and a T-shaped rod attachment leg 2b extending diagonally upward to the front and formed integrally with the reel body 2a.

As shown in FIG. 2, the reel body 2a includes a body member 2c having an accommodation space in the interior thereof that opens to the side, and a lid member 2d detachably mounted on the body member to cover the opening of the body member 2c. As shown in FIGS. 1 and 2, the rod attachment leg portion 2b is a substantially T-shaped solid and thick-walled member. The front end portion of the rod attachment leg 2b extends toward both the front and the rear so that a fishing rod (not shown in the figures) can be mounted thereon.

The body member 2c is, for example, made of a metal or a synthetic resin, and as shown in FIG. 2, an opening is formed on the side thereof and an accommodation space is formed in the interior thereof (not shown in the figures). The accommodation space (not shown in the figures) is provided with a rotor drive mechanism (not shown in the figures) to rotate the rotor 3 and an oscillating mechanism (not shown in the figures) to move the spool 4 back and forth relative to the reel unit 2 to wind the fishing line uniformly. The lid member 2d is, for example, made of a metal or a synthetic resin, and is mounted to close the opening of the body member 2c. The lid member 2d is formed integrally with the rod attachment leg 2b that extends upward.

As shown in FIGS. 1 and 2, a reduced thickness portion 50 is formed at the upward rear surface of the connecting portion between the rod attachment leg 2b and the lid member 2d of the reel body 2a. A cover member 70 is mounted extending from the rear portion to the lower portion to cover at least the peripheral rim 50a of the reduced thickness portion 50.

As shown in FIG. 1 and FIG. 2, the reduced thickness portion 50 includes a through hole 51 that passes through a portion of the rod attachment leg 2b and the lid member 2d, and an indentation 52 which is formed around the periphery of the through hole 51 and in which a portion of the rod attachment leg 2b and the reel body 2a are recessed from surrounding surfaces of the rod attachment leg 2b and the reel body 2a. As seen in FIG. 1, the through hole 51 is further recessed from the indentation 52. The through hole 51 is arranged at a position offset from a central portion of the indentation 52 of the reduced thickness portion 50. The indentation 52 includes an oblique surface that is inclined toward the through hole 51.

The cover member 70 is preferably made of a metal or a synthetic resin, and as shown in FIGS. 1 and 2, is mounted to cover the periphery of the through hole 51. The cover member 70 includes an opening 71 that faces the through hole 51 and an oblique surface 72 that is arranged to be curved into a convex shape along the oblique surface of the indentation 52. The cover member 70 is fixedly attached to the body member 2c and the lid member 2d via a screw member (not shown in the figures).

As shown in FIGS. 1 and 2, the rotor 3 has a cylindrical portion 30 and first and second rotor arms 31 and 32 disposed in opposition to one another at the sides of the cylindrical portion 30. The cylindrical portion 30 and the first and second rotor arms 31 and 32 are integrally formed. A wall having a through hole (not shown in the figures) is formed on the front of the cylindrical portion 30, through which the pinion gear and the spool shaft pass through.

As shown in FIG. 1, a first bail support member 40 is pivotably mounted to the outer peripheral side of the front end of the first rotor arm 31. A line roller 41 is attached to the front end of the first bail support member 40 to guide fishing line onto the spool 4. A second bail support member 42 is pivotally mounted to the outer peripheral side of the front end of the second rotor arm 32. A bail 43 is provided between the line roller 41 at the front end of the first bail support member 40 and the second bail-support member 42.

The first bail support member 40, the second bail support member 42, the line roller 41, and the bail 43 together constitute a bail arm 44.

Referring now to FIGS. 1 and 2, the spool 4 is arranged between the first rotor arm 31 and the second rotor arm 32 of the rotor 3, and is fitted to the front end of the spool shaft with a drag mechanism (not shown in the figures) interposed between the spool 4 and the spool shaft. The spool 4 has a line winding cylinder 4a around the outer periphery of which the fishing line is wound, a skirt 4b formed integrally at the rear of the line winding cylinder 4a, and a front flange 4c fixedly formed at the front of the line winding cylinder 4a.

In a spinning reel constructed in this matter, the reduced thickness portion 50 is formed above the portion that connects the rod attachment portion 2b and the lid member 2d. By covering the peripheral rim portion of the reduced thickness portion 50 with the cover member 70, the overall weight of the reel unit 2 can be reduced and the overall strength of the reel unit 2 can be maintained at a high level.

Modifications of the First Embodiment (a) The type of spinning reels to which the present invention can be applied is not limited to the foregoing embodiment. The present invention can be suitably applied to spinning reels having a drag mechanism or a control mechanism having a brake lever instead of a reverse rotation prevention mechanism.

Figure 3:
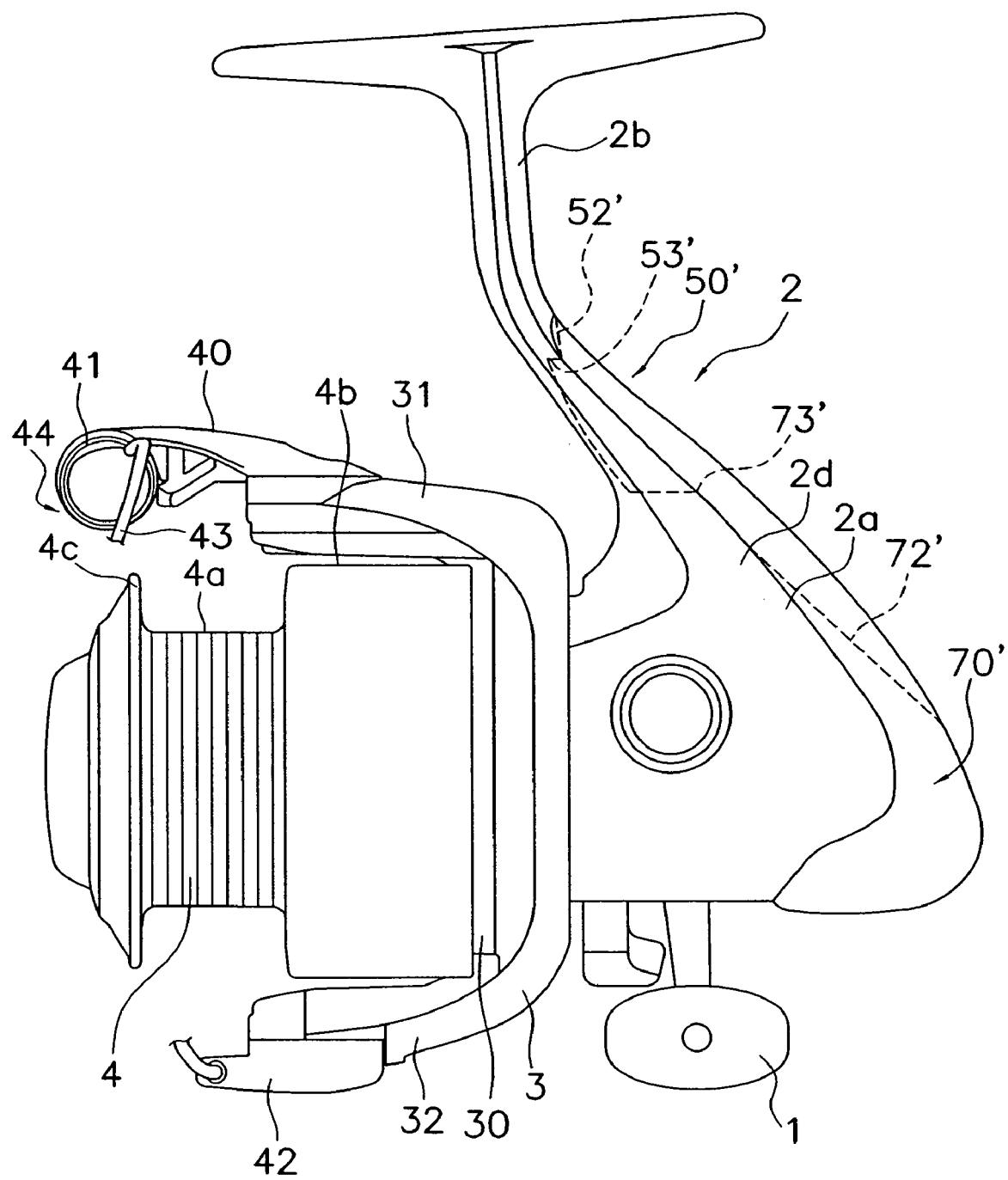
FIG. 3 is a lateral view of a spinning reel in accordance with a first modification of the first embodiment corresponding to FIG. 1.
Figure 4:
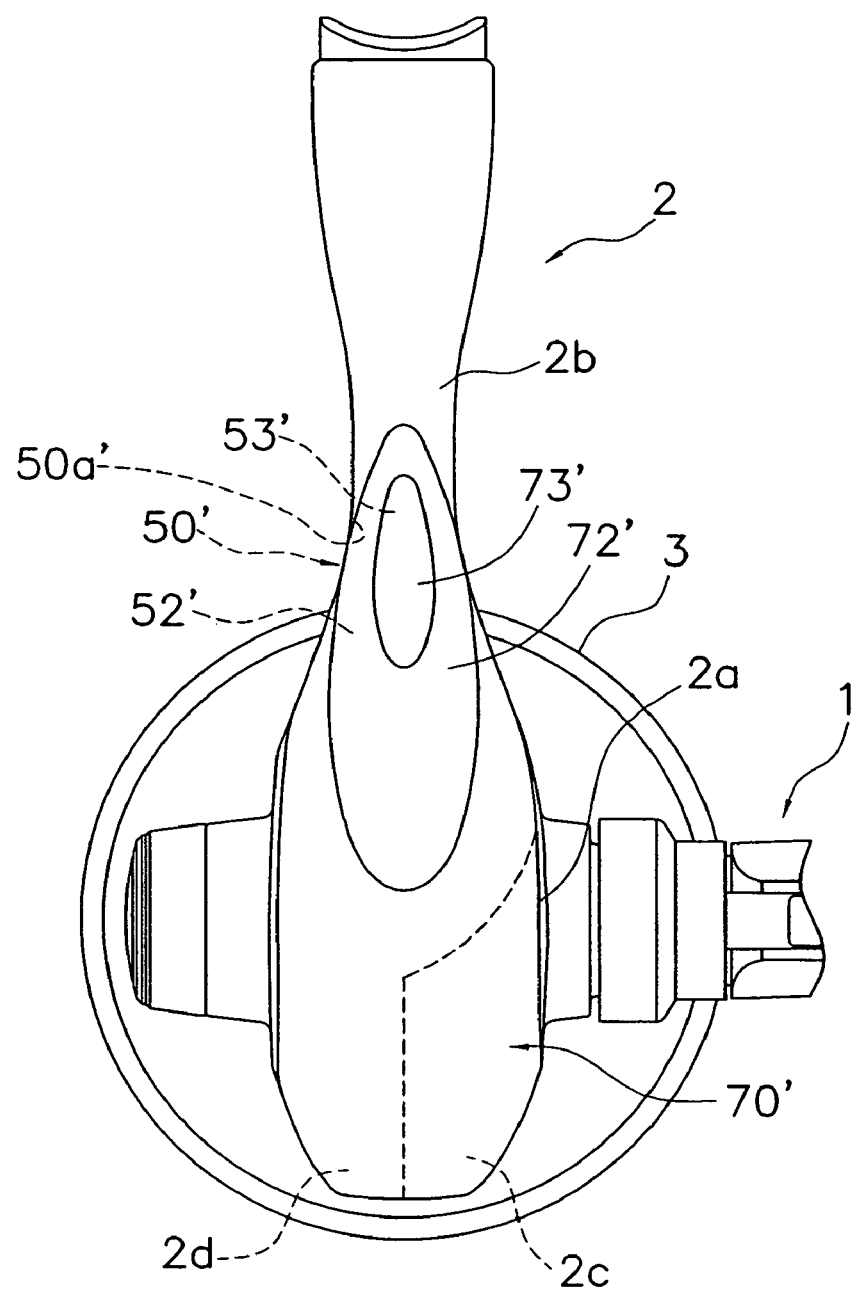
FIG. 4 is a rear view of the spinning reel of FIG. 3 corresponding to FIG. 2.
Figure 5:
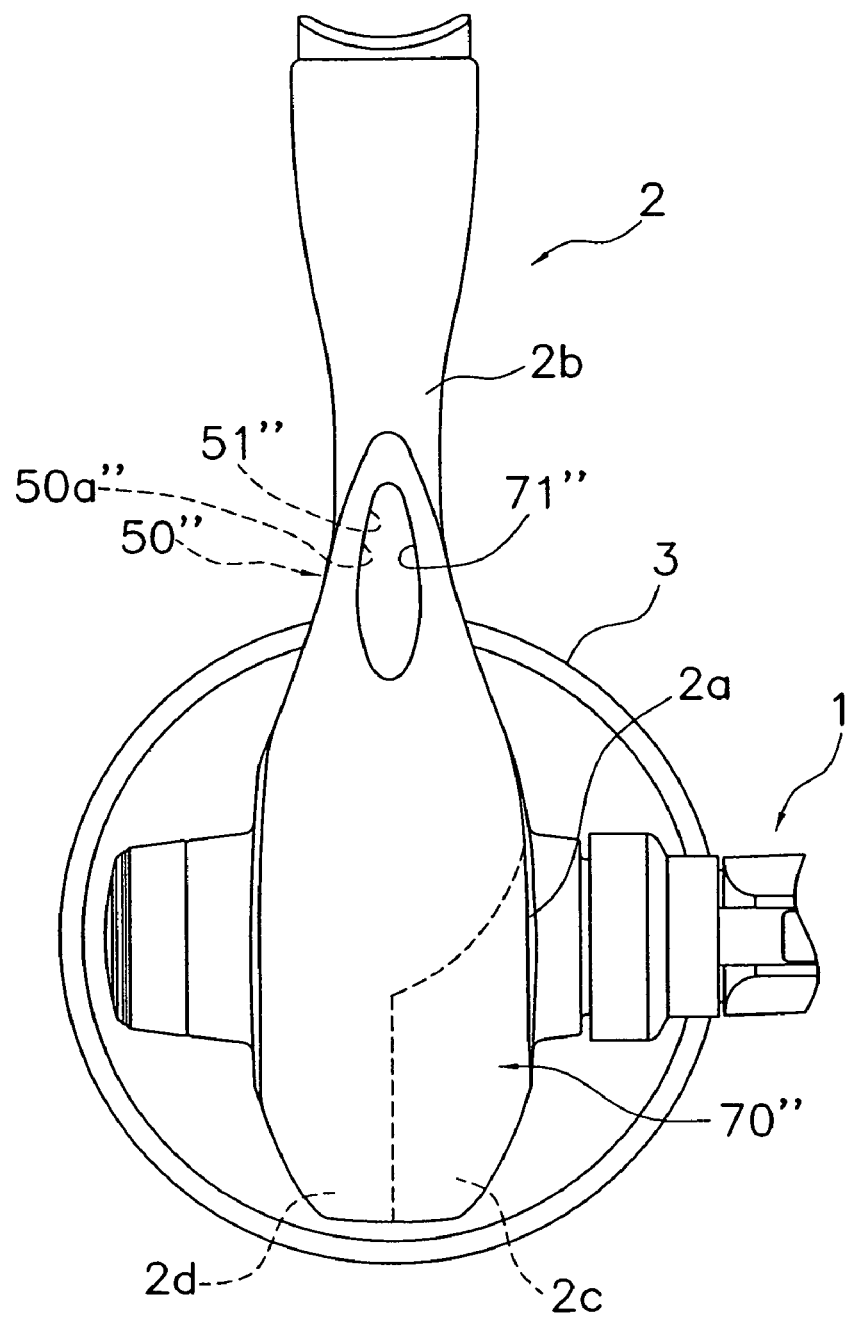
FIG. 5 is a rear view of a spinning reel in accordance with a second modification of the first embodiment corresponding to FIG. 2.
Figure 6:
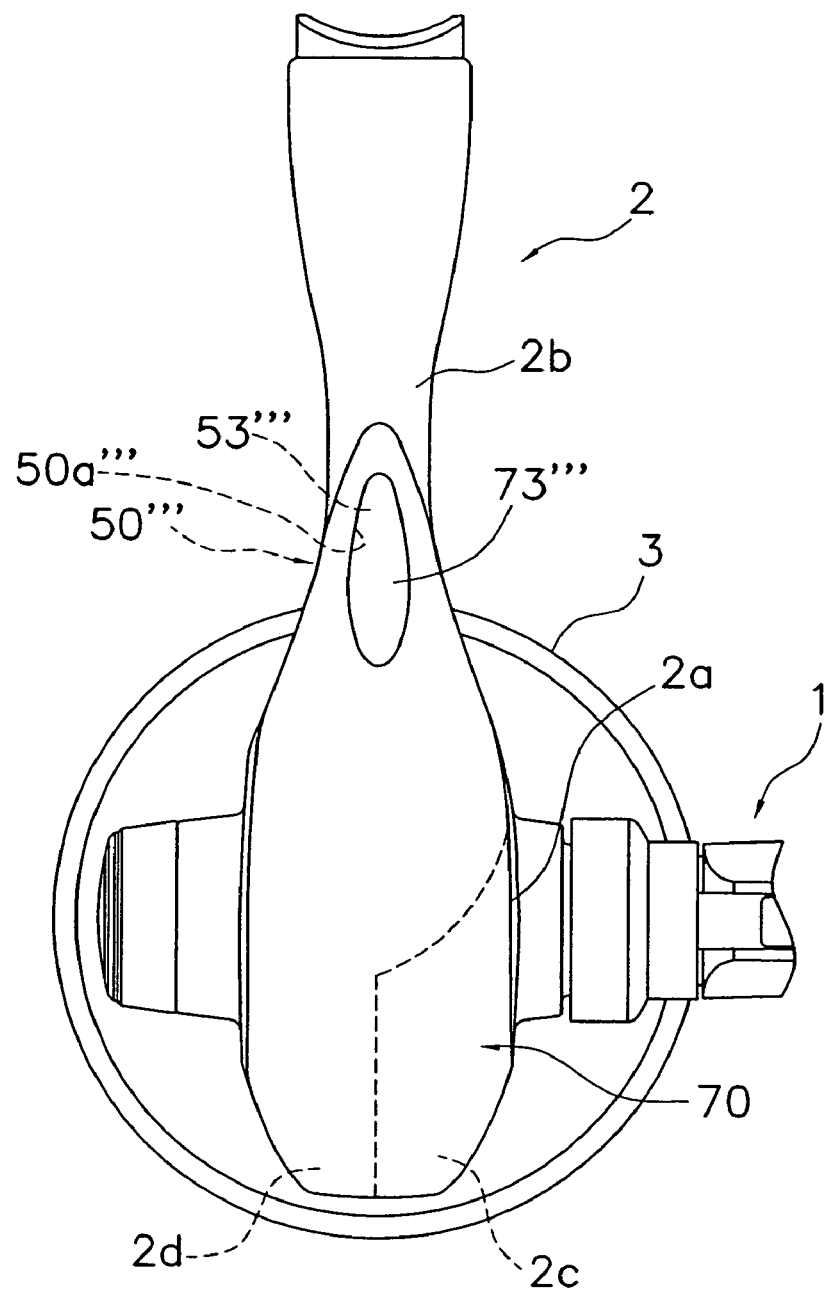
FIG. 6 is a rear view of a spinning reel in accordance with a third modification of the first embodiment corresponding to FIG. 2.

(b) In the foregoing embodiment, the through hole 51 and the indentation 52 are provided as the reduced thickness portion 50, and the opening portion 71 and the oblique surface 72 are provided as the cover member 70. However, as shown in FIGS. 3 and 4, a bottom portion 53' (an example of a recessed portion) and an indentation 52' (another example of a peripheral rim portion), both of which are not through holes, can be provided as the reduced thickness portion 50'. Further, a closing portion 73' that closes the bottom portion 53', and an oblique surface 72' that covers the entire bottom portion 53' can be provided as the cover member 70'. In addition, as shown in FIG. 5, the through hole 51" can be provided as the reduced thickness portion 50", and the opening portion 71" facing the through hole 51" can be provided as part of the cover member 70" that covers the peripheral rim portion 52". Furthermore, as shown in FIG. 6, the bottom portion 53''' that is not a through hole can be provided as part of the reduced thickness portion 50''' and the closing portion 73'''0 that covers the entire bottom portion 53''' can be provided as the cover member 70''', which covers the peripheral rim portion 52'''.

Figure 7:
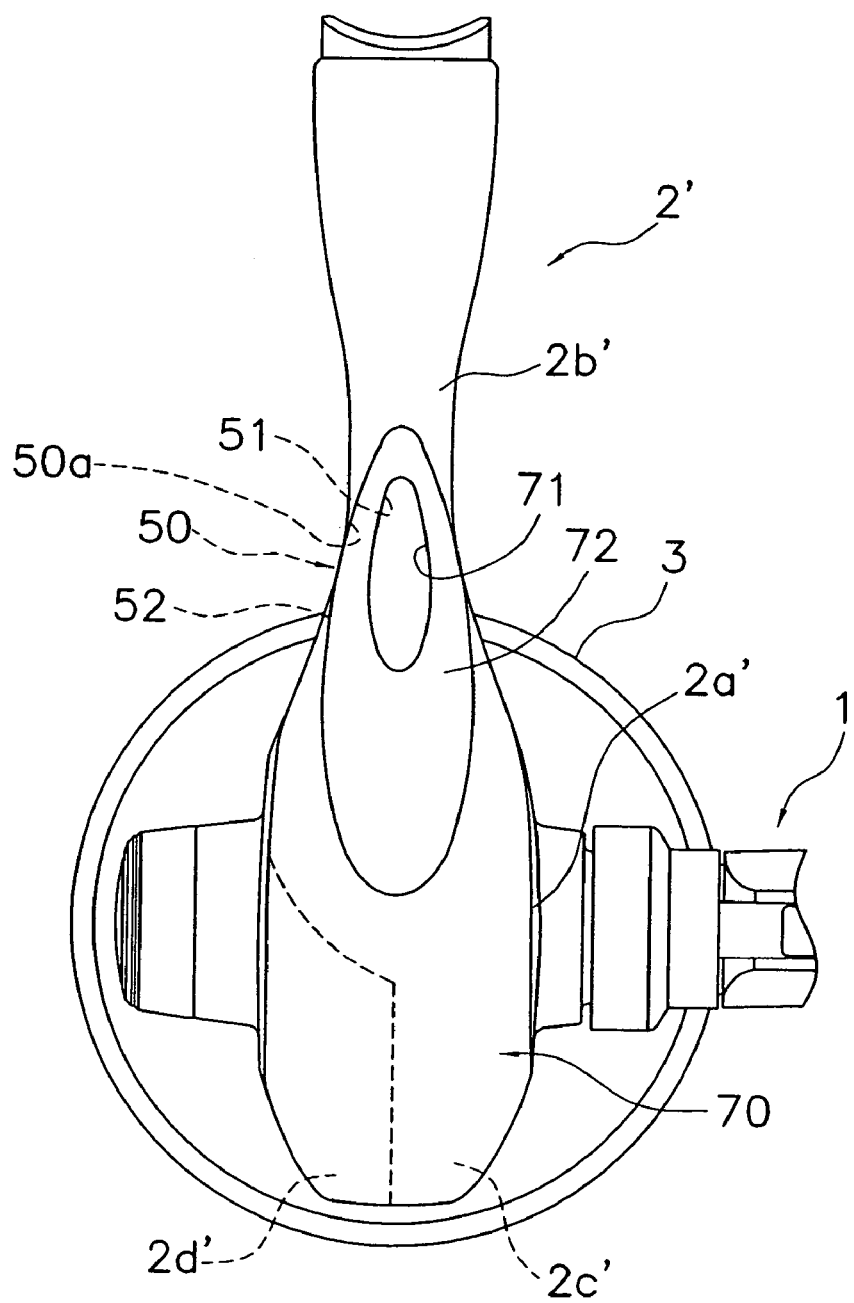
FIG. 7 is a rear view of a spinning reel in accordance with a fourth modification of the first embodiment corresponding to FIG. 2.

(c) In the first embodiment, the lid member 2d is formed integrally with the rod attachment leg portion 2b, but as shown in FIG. 7, the body portion member 2c' can be formed integrally with the rod attachment leg portion 2b'. Note that in this configuration the reduced thickness portion 50 is formed above the portion connecting the rod attachment leg 2b' and the body portion 2c' and the cover member 70 is mounted on the peripheral rim portion of the reduced thickness portion 50.

Figure 8:
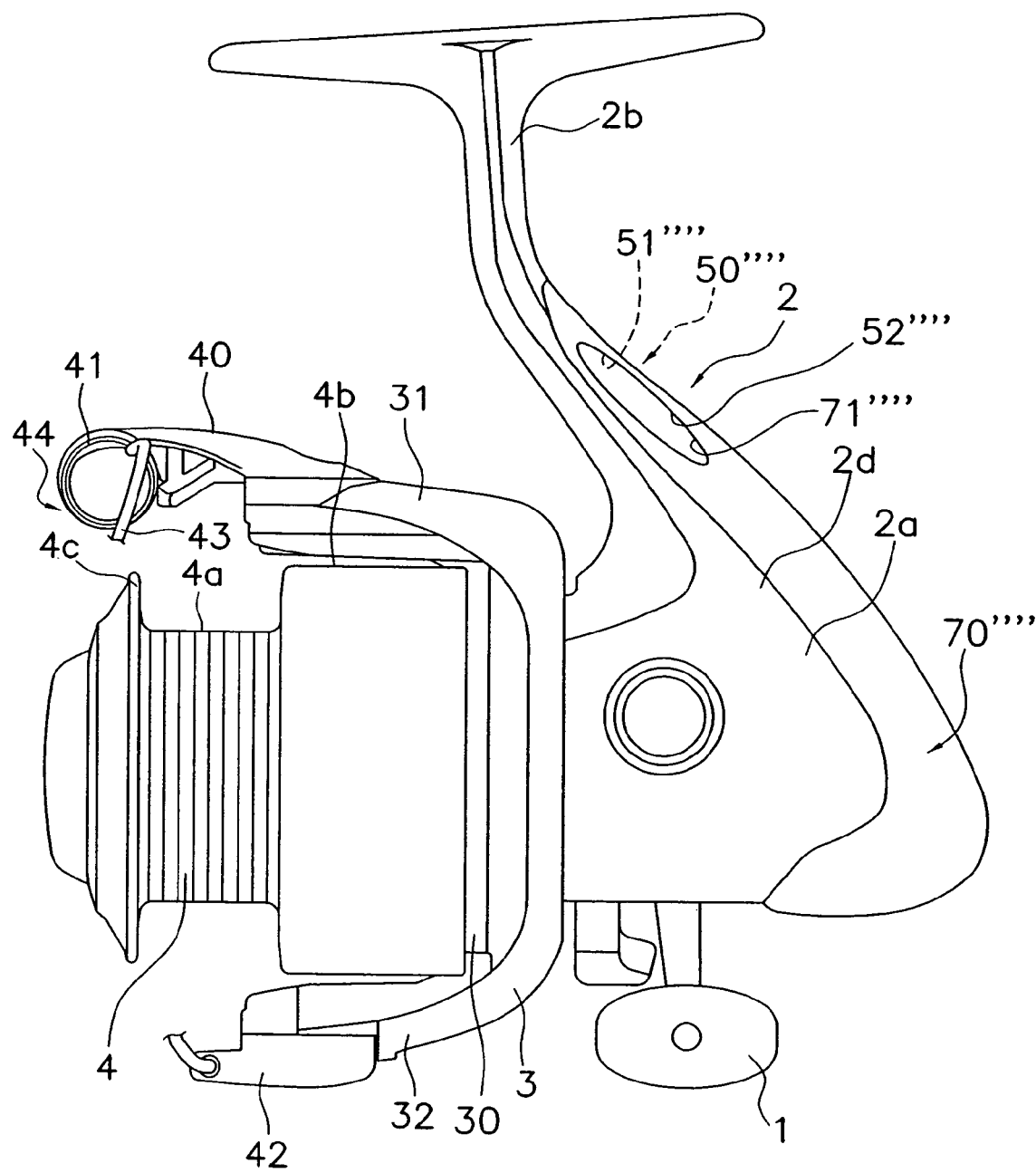
FIG. 8 is a lateral view of a spinning reel in accordance with a fifth modification of the first embodiment corresponding to FIG. 1.

(d) In the foregoing embodiment, the reduced thickness portion 50 is formed at the rear of the rod attachment leg 2b and the reel body 2a, but as shown in FIG. 8, the reduced thickness portion 50'''' made of the through hole 51'''' and the peripheral rim portion 52'''' can be provided on the side portion of the rod attachment leg 2b and the reel body 2a, and the cover member 70'''' having the opening 71'''' can be mounted thereon.

As used herein, the following directional terms "forward, rearward, above, downward, vertical, horizontal, below and transverse"as well as any other similar directional terms refer to those directions of a device equipped with the present invention. Accordingly, these terms, as utilized to describe the present invention should be interpreted relative to a device equipped with the present invention.

Second Embodiment

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Figure 9:
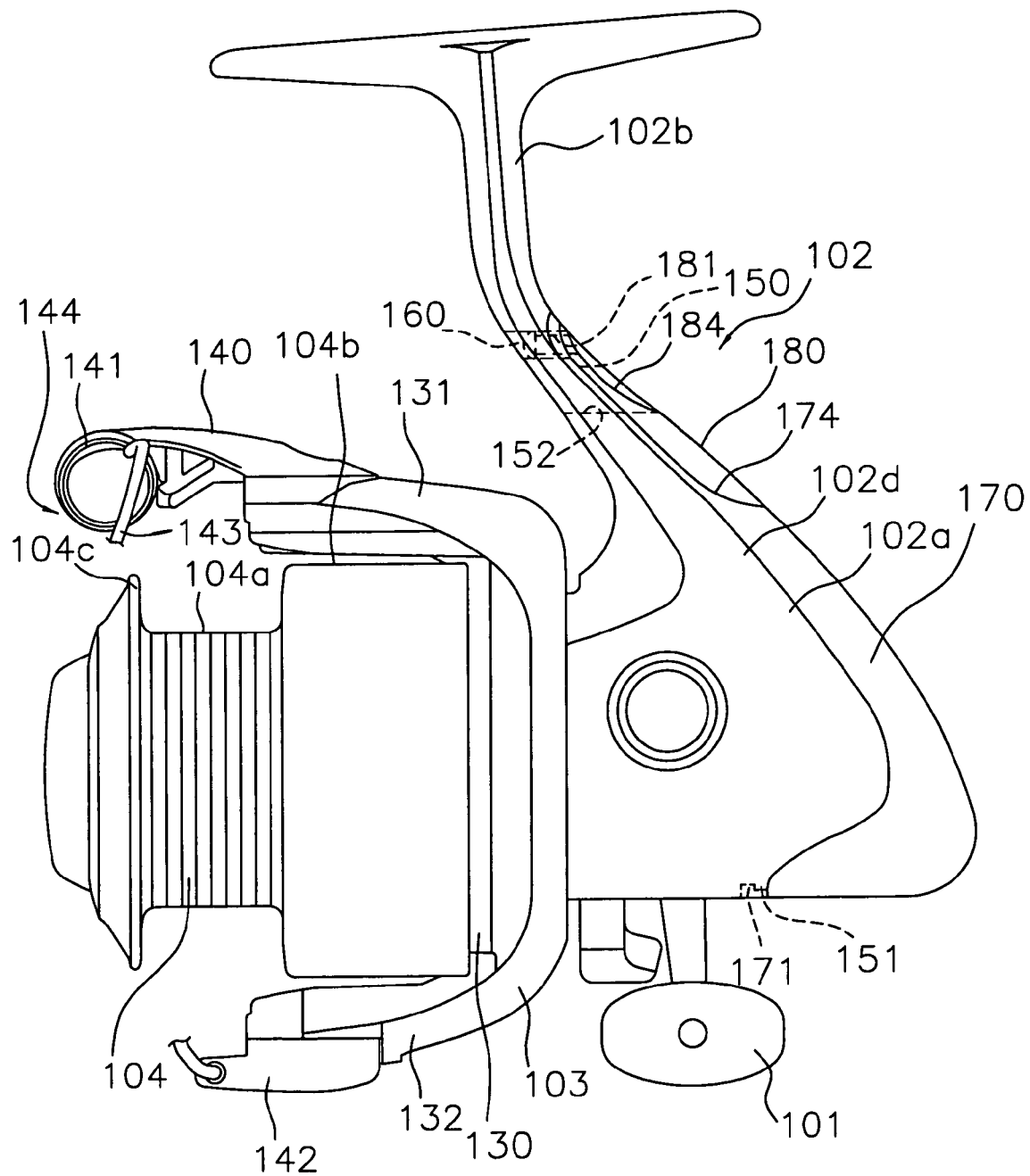
FIG. 9 is a lateral view of a spinning reel according to a second preferred embodiment of the present invention.
Figure 10:
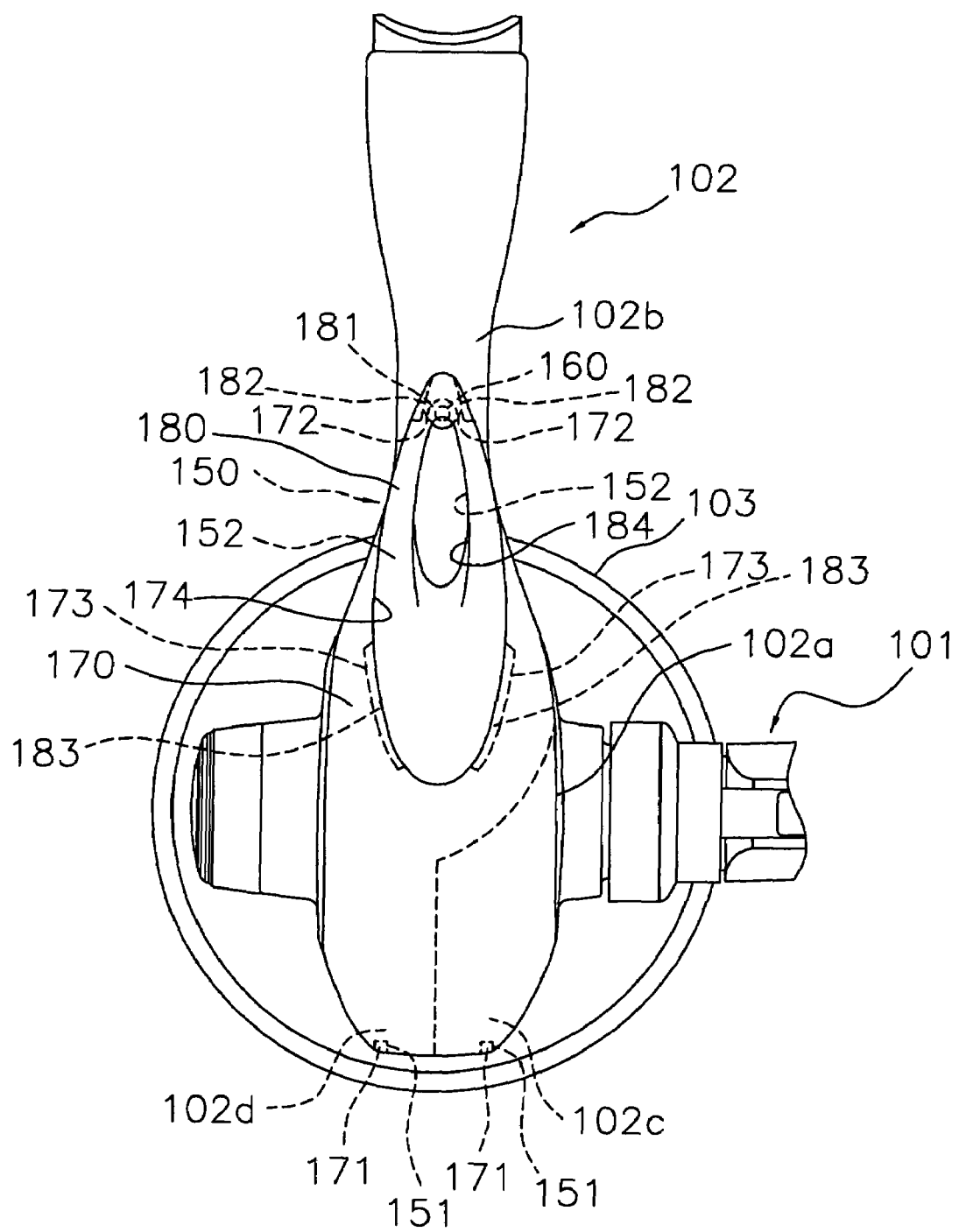
FIG. 10 is a rear view of the spinning reel of FIG. 9.

A spinning reel in accordance with the second embodiment of the present invention is, as shown in FIGS. 9 and 10, a front-drag type of spinning reel and includes a handle 101, a reel unit 102 that rotatably supports the handle 101 and which can be mounted to a fishing rod, a rotor 103, and a spool 104. The rotor 103 is provided to wind fishing line around the spool 104, and is rotatably supported at the front of the reel unit 102. The spool 104 has fishing line wound around the outer peripheral surface thereof, and is disposed on the front of the rotor 103. In other words, the spool 104 and reel unit 102 interpose the rotor 103. The spool 104 can be reciprocated relative to the reel unit 102. The handle 101 is mounted on the right side of the reel unit 102 as shown in FIGS. 9 and 10, but it can also be mounted on the left side of the reel unit 102.

As shown in FIGS. 9 and 10, the reel unit 102 includes a reel body 102a to accommodate a variety of mechanisms in the interior thereof (not shown in Figures), and a T-shaped rod attachment leg 102b extending diagonally upward and forward and formed integrally with the reel body 102a.

As shown in FIG. 10, the reel body 102a includes a body member 102c having an accommodation space in the interior thereof that is open to a side, and a lid member 102d detachably mounted on the body member 102c in order to cover the opening of the body member 102c. As shown in FIGS. 9 and 10, the rod attachment leg 102b is an approximately T-shaped solid and thick-walled member integrally formed with the lid member 102d. The tip portion of the rod attachment leg 102b extends toward both the front and the rear, and a fishing rod (not shown in the figures) can be mounted thereon.

The body member 102c is, for example, preferably made of a metal or a synthetic resin, and as shown in FIG. 10, an opening is formed on the side thereof and an accommodation space is formed in the interior thereof (not shown in the figures). The accommodation space (not shown in the figures) is provided with a rotor drive mechanism (not shown in the figures) to rotate the rotor 103 and an oscillating mechanism (not shown in the figures) to move the spool 104 back and forth to wind the fishing line uniformly. The lid member 102d is, for example, made of a metal or a synthetic resin, and is mounted to close the opening of the body member 102c. The lid member 102d is formed integrally with the rod attachment leg 102b that extends upward.

As shown in FIGS. 9 and 10, a reduced thickness portion 150 is recessed from the surrounding surfaces of the rear portion of the reel body 102a and the rod attachment leg 102b. First engagement portions 151 that are each concave cut-out portions are formed in two left and right positions in the reduced thickness portion 150 of the lower portion of the reel body 102a. A second hole portion 152 is formed in the portion of the reduced thickness portion 150 that connects the reel body 102a with the rod attachment leg 102b, such that the second hole portion 152a passes through the reel body 102a and the rod attachment leg 102 from front to rear. A first cover member 170 is mounted from the rear on the entire reduced thickness portion 150, and a second cover member 180 is detachably mounted from the rear on the upper portion of the first cover member 170.

As shown in FIG. 9, the rotor 103 has a cylindrical portion 130, and first and second rotor arms 131 and 132 disposed in opposition to one another at the sides of the cylindrical portion 130. The cylindrical portion 130 and the first and second rotor arms 131 and 132 are integrally formed. A wall having a through hole (not shown in the figures) is formed on the front of the cylindrical portion 130, through which the pinion gear and the spool shaft pass through as shown in FIG. 10.

As shown in FIG. 9, a first bail support member 140 is mounted pivotably on the outer peripheral side of the fore-end of the first rotor arm 131. A line roller 141 is mounted to the front end of the first bail support member 140 to guide fishing line onto the spool 104. A second bail support member 142 is pivotably mounted to the outer peripheral side of the front end of the second rotor arm 132. A bail 143 is provided between the line roller 141 at the front end of the first bail support member 140 and the second bail support member 142. The first bail support member 140, the second bail support member 142, the line roller 141, and the bail 143 together constitute a bail arm 144.

Referring now to FIGS. 9 and 10, the spool 104 is arranged between the first rotor arm 131 and the second rotor arm 132 of the rotor 103, and is mounted to the front end of the spool shaft with a drag mechanism (not shown in the figures) interposed between the spool 104 and the spool shaft. The spool 104 has a line winding cylinder 104a around the outer periphery of which the fishing line is wound, a skirt 104b formed integrally at the rear of the line winding cylinder 104a, and a front flange 104c fixedly formed with the front of the line winding cylinder 104a.

The first cover member 170 and the second cover member 180 are made of a metal or a synthetic resin, and as shown in FIGS. 9 and 10, are cover members that are formed into curved plate shapes having openings on the upper portions thereof. The outer shape of the second cover member 180 is formed to be smaller than the outer shape of the first cover member 170.

Figure 11:
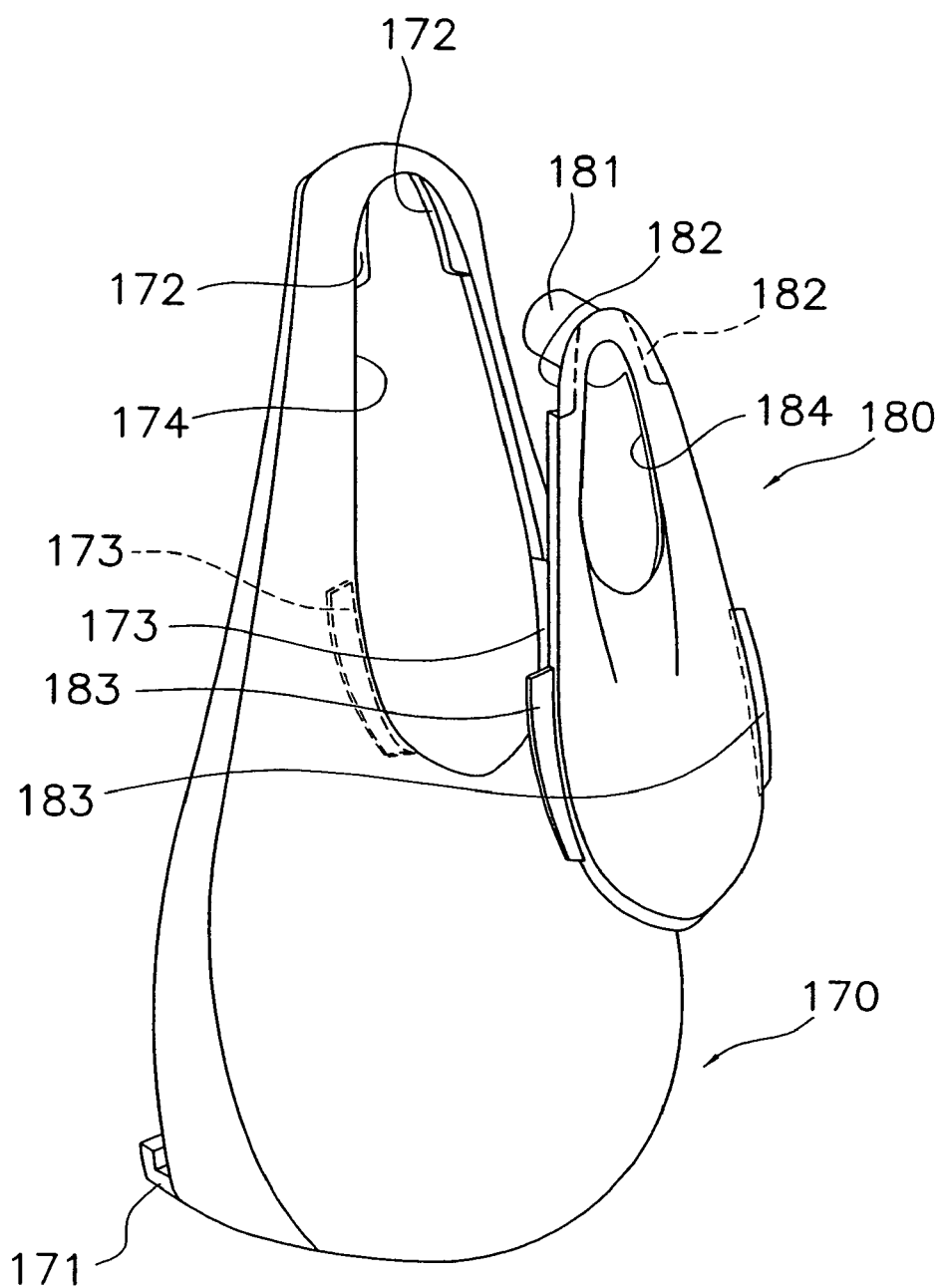
FIG. 11 is an oblique view of a first cover member and a second cover member of the spinning reel of FIG. 9.

As shown in FIGS. 9 to 11, the first cover member 170 includes a first hole portion 174, first engaged portions 171, second engaged portions 172, and third engagement portions 173. The first hole portion 174 is formed above the rear portion. The first engaged portions 171 are formed to project frontward in two locations below the rear portion. The second engaged portions 172 are formed to project outward in two locations on the inner sides of the upper portion of the first hole portion 174. The third engagement portions 173 are formed in concave shapes in two locations on the inner sides of the lower portion of the first hole portion 174. The first engaged portions 171 are engaged with the first engagement portions 151 from the front. The first hole portion 174 is arranged to communicate with the second hole portion 152.

As shown in FIG. 9 to FIG. 11, the second cover member 180 includes a third hole 184, a boss portion 181, second engagement portions 182, and third engaged portions 183. The third hole 184 is formed above the rear portion. The boss portion 181 is formed to project outward on the front side around the peripheral edge portion of the upper portion of the third hole portion 184. The second engagement portions 182 are formed in concave shapes in two positions on the outer sides of the upper portion of the third hole portion 184. The third engaged portions 183 are formed to project outward in two locations on the outer sides of the lower portion of the third hole portion 184 that is separated from the boss portion 181. As shown in FIGS. 9 to 11, the boss portion 181 is arranged on the portion that connects the reel body 102a with the rod attachment leg 102b, and a screw member 160 that is inserted and mounted in the second hole portion 152 and the first hole portion 174 from the front is attached to the boss portion 181. The boss portion 181 has a female threaded portion (not shown in the figures) formed therein that opens on the front side, and can engage with a male threaded portion (not shown in the figures) on the screw member 160. The second engagement portions 182 are engaged with the second engaged portions 172 from the rear side. The third engaged portions 183 are engaged with the third engagement portions 173 from the front. The third hole portion 184 is formed to communicate with the second hole portion 152.

In order to mount this type of first cover member 170 and second cover member 180, the first engaged portions 171 of the first cover member 170 are first engaged from the front with the first engagement portions 151 in the lower portion of the reel body 102a. Next, the third engaged portions 183 of the second cover member 180 are engaged with the third engagement portions 173 of the first cover member 170 from the front, and the second engaged portions 172 of the first cover member 170 are engaged with the second engagement portions 182 on the upper portion of the second cover member 180 from the rear. In this state, the screw member 160 is mounted in the boss portion 181 on the upper portion of the second cover member 180 and fixedly coupled to the portion connecting the rod attachment leg 102b and the reel body 102a. Here, the first cover member 170 and the second cover member 180 are loosely retained to one another by the second engagement portions 182 and the second-engaged portions 172. Further, the second cover member 180 and the first cover member 170 are loosely retained to one another by the third engagement portions 173 and the third engaged portions 183, and the first cover member 170 and the second cover member 180 are fixedly attached to the reel unit 102 by the boss portion 181 of the second cover member 180. Thus, by providing the boss portion 181 on the second cover member 180, the first cover member 170 and the second cover member 180 can be retained to one another while the first cover member 170 and the second cover member 180 are fixedly attached to the reel unit 102. Therefore, since the need to provide a boss portion on the first cover member 170 will be eliminated, the first cover member 170 and the second cover member 180 can be mounted with an inexpensive structure.

Modifications of the Second Embodiment (e) The type of spinning reels to which the present invention can be applied is not limited to the foregoing embodiment. The present invention can be suitably applied to spinning reels having a drag mechanism or a control mechanism having a brake lever instead of a reverse rotation prevention mechanism. In addition, although a front drag type of spinning reel was used in the aforementioned embodiment, as shown in FIGS. 13 and 14, a rear drag type of spinning reel may also be used.

Figure 13:
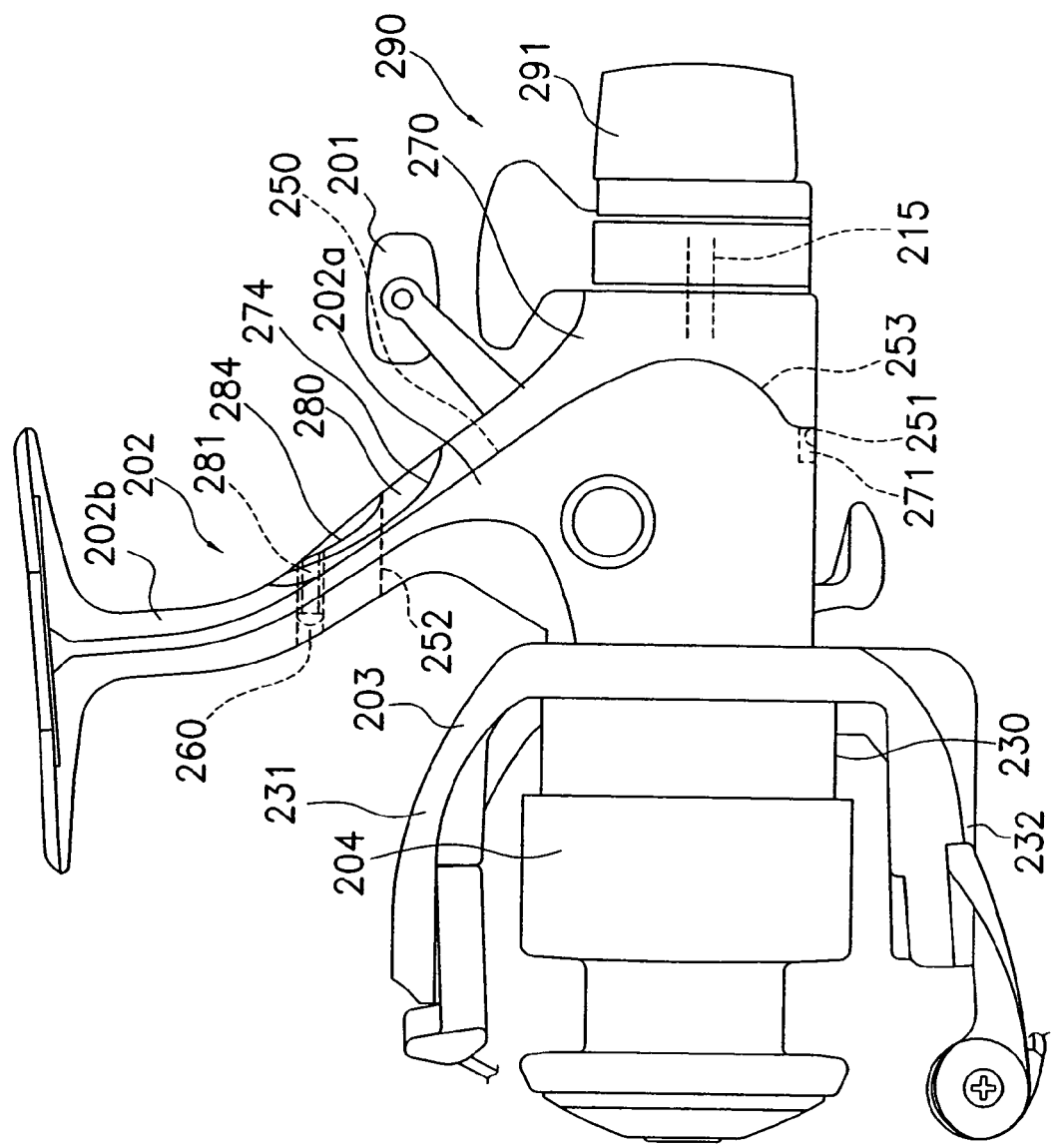
FIG. 13 is a lateral view of a spinning reel in accordance with a second modification of the second embodiment corresponding to FIG. 9.
Figure 14:
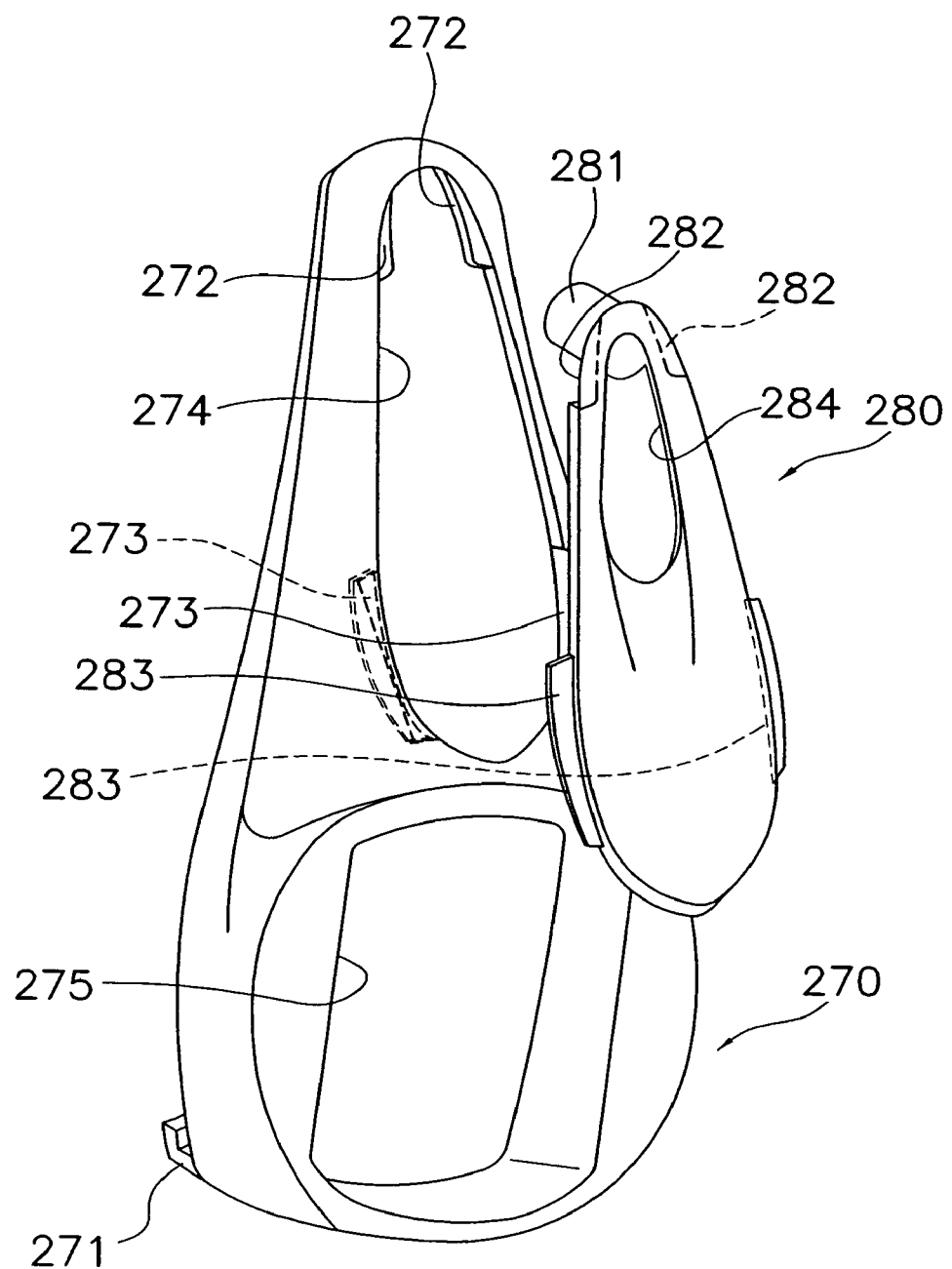
FIG. 14 is an oblique view a first cover member and a second cover member of the spinning reel of FIG. 13 corresponding to FIG. 11.

A spinning reel in accordance with a modification of the second embodiment of the present invention is a rear-drag type spinning reel and, as shown in FIGS. 13 and 14, includes a reel unit 202 that rotatably supports a handle 201, a rotor 203, and a spool 204. The rotor 203 is rotatably supported on the front of the reel unit 202. The spool 204 has fishing line wound around the outer peripheral surface thereof, and is disposed on the front of the rotor 203 so that it can be moved forward and backward relative to the reel unit 202.

The reel unit 202 includes a reel body 202a, and a rod attachment leg 202b extending diagonally upward and forward from the reel body 202a. The reel body 202a has a space (not shown in the figures) to accommodate a variety of mechanisms in the interior thereof. The rotor 203 includes a cylindrical portion 230, and a first rotor arm 231 and second rotor arm 232 which are disposed opposing each other at the sides of the cylindrical portion 230. The spool 204 is disposed between the first rotor arm 231 and the second rotor arm 232 of the rotor 203. The spool 204 is non-rotatably and detachably mounted on a spool shaft 215. A rear drag mechanism 290 is mounted on the rear end of the spool shaft 215.

As shown in FIG. 13, a reduced thickness portion 250 that is recessed from the surrounding surfaces of the rear portion of the reel body 202a and the rod attachment leg 202b. First engagement portions 251 that are each concave cut-out portions are formed in two left and right positions in the reduced thickness portion 250 of the lower portion of the reel body 202a. A second hole portion 252 is formed in the portion of the reduced thickness portion 250 that connects with the reel body 202a of the rod attachment leg 202b, and passes therethrough from front to rear. A fourth hole portion 253 is formed in the reel body 202a and the lower portion of the reduced thickness portion 250, passes therethrough from front to back, such that the spool shaft 215 can be inserted in the fourth hole portion. A first cover member 270 is mounted from the rear on the entire reduced thickness portion 250, and a second cover member 280 is detachably mounted from the rear on the upper portion of the first cover member 270. Referring now to FIGS. 13 and 14, a fifth hole portion 275 that communicates with the fourth hole portion 253 is formed in the lower portion of the rear end of the first cover member 270. Further, the rear drag mechanism 290 is mounted on the spool shaft 215 that is inserted in the fourth hole portion 253 and the fifth hole portion 275.

As shown in FIG. 13, the rear drag mechanism 290 is connected non-rotatably and movably in the axial direction to the rear end portion of the spool shaft 215. The rear drag mechanism 290 brakes the rotation of the spool 204 in the line reel-out direction via the spool shaft 215. The rear drag mechanism 290 includes a cylindrical knob portion 291 to adjust the drag force manually.

The first cover member 270 and the second cover member 280 are preferably made of a metal or a synthetic resin, and as shown in FIGS. 13 and 14, are cover members that are curved in plate shapes having openings on the upper portions thereof. The outer shape of the second cover member 280 is formed to be smaller than the outer shape of the first cover member 270. In addition, the second cover member 280 is disposed above the fifth hole portion 275 of the first cover member 270.

As shown in FIGS. 13 and 14, the first cover member 270 includes a first hole portion 274, first engaged portions 271, second engaged portions 272, and third engagement portions 273. The first hole portion 274 is formed above the rear portion. The first engaged portions 271 are formed to project outward in two locations on the front side below the rear portion. The second engaged portions 272 are formed to project outward in two locations on the inner sides of the upper portion of the first hole portion 274. The third engagement portions 273 are formed in concave shapes in two locations on the inner sides of the lower portion of the first hole portion 274. The first engaged portions 271 are engaged in the first engagement portions 251 from the front. The first hole portion 274 is arranged to communicate with the second hole portion 252.

As shown in FIGS. 13 and 14, the second cover member 280 includes a third hole 284, a boss portion 281, second engagement portions 282, and third engaged portions 283. The third hole 284 is formed above the rear portion, a boss portion 281 is formed to project outward on the front side around the peripheral edge portion of the upper portion of the third hole portions 284. The second engagement portions 282 are formed in concave shapes in two positions on the outer sides of the upper portion of the third hole portion 284. The third engaged portion 283 is formed to project outward in two locations on the outer sides of the lower portion of the third hole portion 284 that is separated from the boss portion 281. The boss portion 281 is arranged on the portion that connects the reel body 202a with the rod attachment leg 202b. Further, a screw member 260 that is inserted and mounted in the second hole portion 252 and the first hole portion 274 from the front is attached to the boss portion 281. The boss portion 281 has a female threaded portion (not shown in the figures) formed therein that opens on the front side, and can engage with a male threaded portion (not shown in the figures) on the screw member 260. The second engagement portions 282 are engaged with the second engaged portions 272 from the rear side. The third engaged portions 283 are engaged with the third engagement portions 273 from the front. The third hole portion 284 is formed to communicate with the second hole portion 252.

In order to mount this type of first cover member 270 and second cover member 280, the first engaged portions 271 of the first cover member 270 are first engaged from the front with the first engagement portions 251 in the lower portion of the reel body 202a. Next, the third engaged portion 283 of the second cover member 280 engages with the third engagement portion 273 of the first cover member 270 from the front, and the second engaged portion 272 of the first cover member 270 engages with the second engagement portion 282 on the upper portion of the second cover member 280 from the rear. In this state, the screw member 260 is mounted in the boss portion 281 on the upper portion of the second cover member 280 and fixedly coupled to the portion connecting the rod attachment leg 202b and the reel body 202a. Here, while the first cover member 270 and the second cover member 280 are loosely retained to one another by the second engagement portions 282 and the second engaged portions 272, and by the third engagement portions 273 and the third engaged portions 283, the first cover member 270 and the second cover member 280 are fixedly attached to the reel body 202a and the rod attachment leg 202b by the boss portion 281 of the second cover member 280. By providing the boss portion 281 on the second cover member 280 in this way, the first cover member 270 and the second cover member 280 are loosely retained to one another while the first cover member 270 and the second cover member 280 are fixedly coupled to the reel body 202a and the rod attachment leg 202b. Then, after mounting the first cover member 270 and the second cover member 280, the rear drag mechanism 290 described above will be mounted. Here, even with a spinning reel having the rear drag mechanism 290, since the need to provide a boss portion on the first cover member 270 will be eliminated, the first cover member 270 and the second cover member 280 can be mounted with an inexpensive structure.

Figure 12:
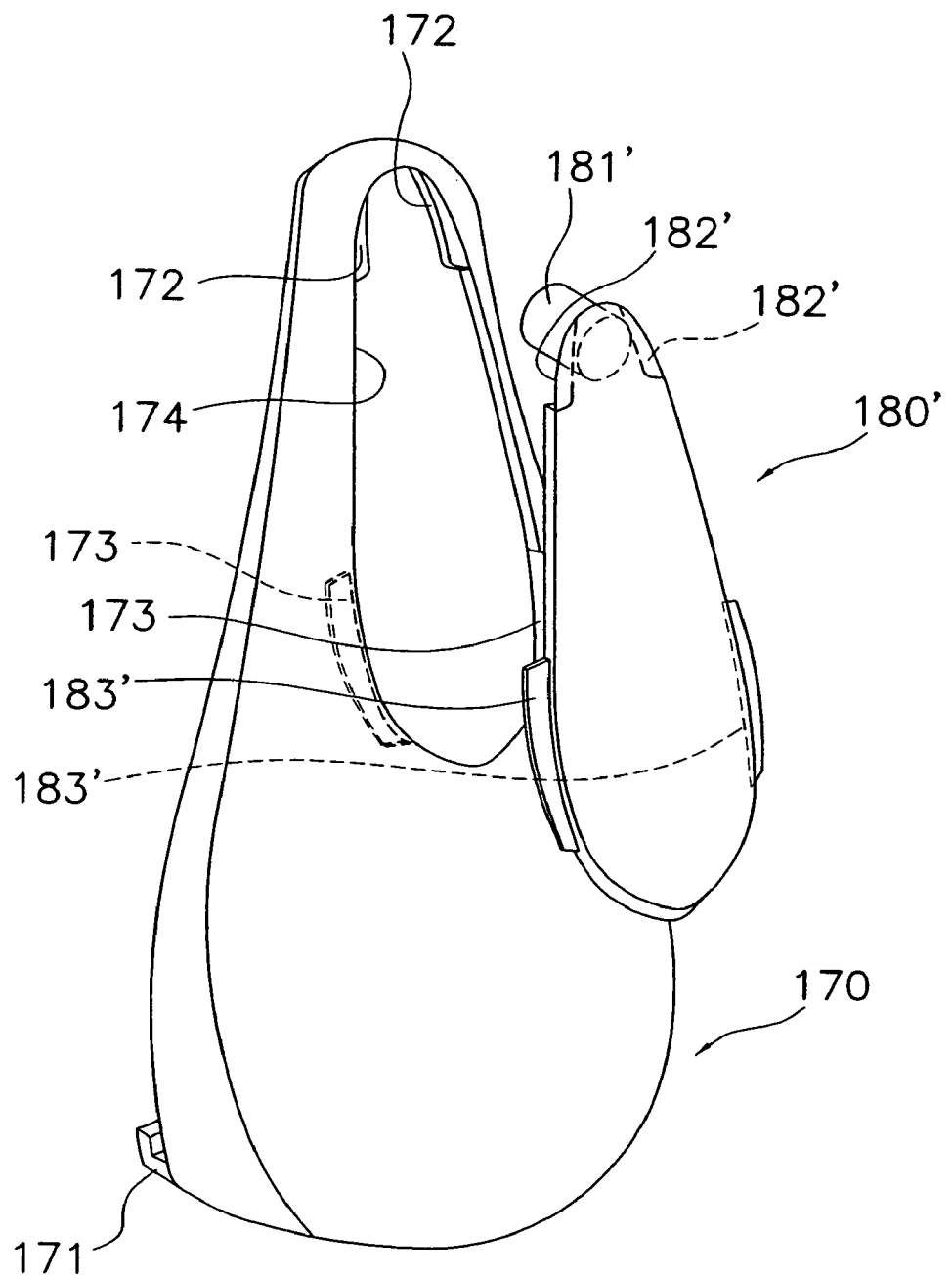
FIG. 12 is an oblique view of a first cover member and a second cover member of a spinning reel in accordance with a modification of the second embodiment corresponding to FIG. 11.

(f) In the aforementioned embodiment, the third hole 184 is formed to pass through the second cover member 180. However, as shown in FIG. 12, a configuration in which a hole portion is not formed in the second cover member 180' is also possible. In addition, the third hole portion 184 is not limited to a through hole, and may also be a concave portion that does not pass through. On the other hand, in the aforementioned embodiment, the second hole portion 152 was formed in the rod attachment portion 102b, but a configuration in which a hole portion is not formed in the rod attachment leg 102b is also possible.

Figure 15:
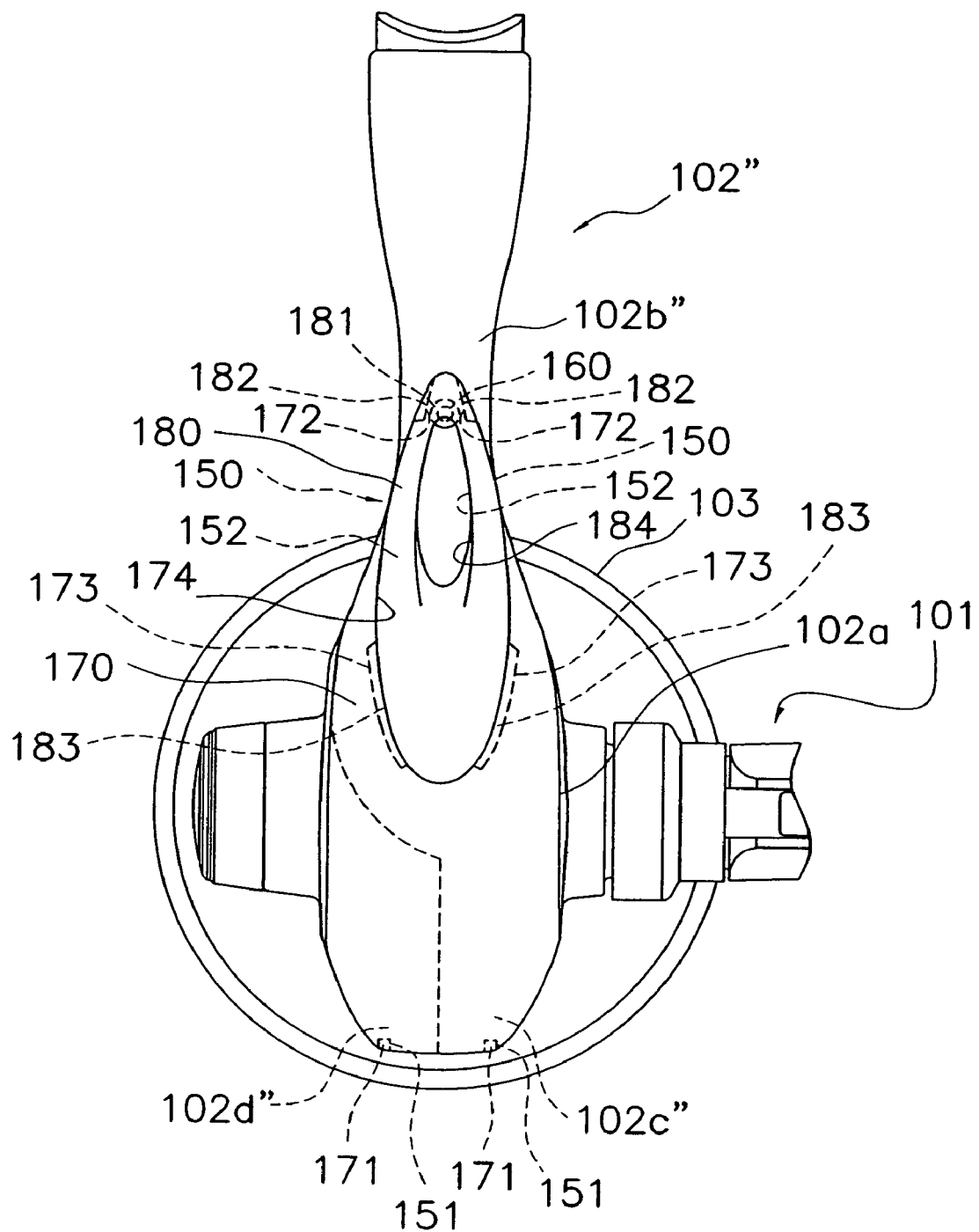
FIG. 15 is a rear view of a spinning reel in accordance with a third modification of the second embodiment corresponding to FIG. 10.

(g) In the foregoing embodiment, the lid member 102d is formed integrally with the rod attachment leg portion 102b, but as shown in FIG. 15, the body member 102c" can be formed integrally with the rod attachment leg portion 102b". Thus, the lid member 102d" may be formed separately from the rod attachment leg portion 102b".

(h) In the aforementioned embodiment, the screw member 160 is mounted in the boss portion 181 to fixedly attach the first cover member 170 and the second cover member 180 to the reel body 102a and the rod attachment leg 102b. However, the method of fixing the first cover member 170 and the second cover member 180 is not limited to screwing.

(i) In the aforementioned embodiment, the first cover member 170 and the second cover member 180 are formed into curved plate shapes. However, they are not limited to these shapes, and may be other shapes. In addition, the reduced thickness portion 150 may be formed into any shape that matches the first cover member 170. Furthermore, a configuration in which the reduced thickness portion 150 is not formed is also possible.

(j) In the aforementioned embodiment, the first cover member 170 and the second cover member 180 are both made of metal or synthetic resin. However, the first cover member 170 and the second cover member 180 may be formed from materials that are different from each other. For example, by forming the first cover member 170 with a hard material, and forming the second cover member 180 with a material that has excellent printing qualities, it is possible to maintain the strength of the reel at a high level by the first cover member 170 while improving the printing qualities of the surface of the second cover member 180 as a place for a company insignia or the like. Note also that it is possible to separately treat the surface of the first cover member 170 to harden it, and to treat the surface of the second cover member 180 to improve its printing qualities.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-317778 and 2004-043987. The entire disclosures of Japanese Patent Application No. 2003-317778 and 2004-043987 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A reel unit for a spinning reel adapted to be mounted to a fishing rod and capable of reeling out forward fishing line, comprising:
    a reel body;
    a T-shaped rod attachment leg adapted to be mounted to the fishing rod, the T-shaped rod attachment leg extending diagonally frontward and being formed integrally with the reel body;
    a reduced thickness portion formed on a rear surface of the rod attachment leg above where the rod attachment leg connects the reel body; and
    a cover member configured to cover at least a peripheral rim portion of the reduced thickness portion,
    the reel body including a first engagement portion on its lower portion, and
    the cover member including,
        a first cover member that is configured to cover a rear portion of the reel body and the rod attachment leg,
        a first hole portion formed on an upper rear portion of the first cover member,
        a first engaged portion formed on a lower portion of the first cover member to engage with the first engagement portion at a front end of the first cover member,
        a second engaged portion formed in the first hole portion,
        a third engagement portion formed in the first hole portion at a position different from that of the second engaged portion,
        a second cover member mounted to cover the first hole portion of the first cover member, said second cover member including
            a fixing portion that engages the first hole portion from a rear face of the first cover member and configured to be fixedly coupled to the reduced thickness portion,
            a second engagement portion that is configured to engage the second engaged portion from a rear side of the second engaged portion,
            a third engaged portion formed at a position different from that of the fixing portion and configured to engage the third engagement portion from a front side of the third engagement portion.

2. The reel unit according to claim 1, wherein
the reduced thickness portion includes a second hole portion formed where the rod attachment leg connects with the reel body, the second hole portion communicating with the first hole portion.

3. The reel unit according to claim 2, wherein
the second cover member further includes a third hole portion that communicates with the second hole portion.

4. The reel unit according to claim 3, wherein
the reel body further includes a fourth hole portion that passes through the reel body, and
the cover member further includes a fifth hole portion that is formed on the lower rear portion of the first cover member and communicates with the fourth hole portion.

5. The reel unit according to claim 1, wherein
the second engagement portion is a partially cut out recess; and
the second engaged portion is a convex portion that projects inward of the first hole portion and engages with the second engagement portion.

6. The reel unit according to claim 1, wherein
the third engagement portion is a partially cut out recess formed on the first hole portion; and
the third engaged portion is a convex portion that projects outward and engages with the recess.

7. The reel unit according to claim 1, wherein
the fixing portion is a boss portion that engages with a screw member inserted from front.

8. The reel unit according to claim 1, wherein
the reel body further includes a body member, and a lid member configured to be mounted to the body member.

9. The reel unit according to claim 8, wherein the rod attachment leg is formed to be integral with the body member.

10. The reel unit according to claim 8, wherein the rod attachment leg is formed to be integral with the lid member.

* * * * *